United States Patent [19]

Van Der Huizen

[11] Patent Number: 5,064,800

[45] Date of Patent: Nov. 12, 1991

[54] ANIONIC POLYMERIZATION CATALYST COMPOSITIONS

[75] Inventor: Adriaan A. Van Der Huizen, Amsterdam, Netherlands

[73] Assignee: Shell Oil Company, Houston, Tex.

[21] Appl. No.: 604,049

[22] Filed: Oct. 26, 1990

Related U.S. Application Data

[62] Division of Ser. No. 527,922, May 24, 1990, Pat. No. 4,996,273.

[30] Foreign Application Priority Data

Dec. 21, 1989 [DE] Fed. Rep. of Germany ....... 8928955

[51] Int. Cl.$^5$ .............................................. C08F 4/52
[52] U.S. Cl. .................................... 502/153; 502/155; 502/157
[58] Field of Search .................... 502/153, 155, 157

[56] References Cited

U.S. PATENT DOCUMENTS

| | | | |
|---|---|---|---|
| 3,526,604 | 9/1970 | Wadsworth | 260/2 |
| 3,631,006 | 12/1971 | Hawkins | 260/80.7 |
| 4,080,492 | 3/1978 | de Zarauz | 526/177 |
| 4,092,268 | 5/1978 | de Zarauz | 252/430 |
| 4,307,218 | 12/1981 | Bingham et al. | 526/340 |
| 4,355,156 | 10/1982 | Bingham et al. | 528/413 |

FOREIGN PATENT DOCUMENTS 234512 2/1987 European Pat. Off. .

Primary Examiner—Patrick P. Garvin
Assistant Examiner—Brent M. Peebles

[57] ABSTRACT

A highly active anionic polymerization catalyst prepares butadiene polymers having a high 1,4-trans-dienyl content, the catalyst containing an organolithium compound, a barium, strontium or calcium compound, and trialkylaluminum compounds having at least 13 carbon atoms per molecule.

16 Claims, No Drawings

ANIONIC POLYMERIZATION CATALYST COMPOSITIONS

This is a division of application Ser. No. 527,922 filed May 24, 1990 now U.S. Pat. No. 4,996,273.

BACKGROUND

The invention relates to anionic polymerization catalyst compositions useful for preparing homopolymers and copolymers of conjugated dienes having a high 1,4-trans-dienyl content, and more particularly polymers of 1,3-butadiene having a high 1,4-trans-butadienyl content.

Homopolymers of 1,3-butadiene and especially block copolymers of 1,3-butadiene with vinylaromatic compounds or with other conjugated diene compounds, the polymers having a high 1,4-trans-butadienyl content and a low vinyl content, are receiving a lot of attention. Such polymeric materials are claimed to have a number of improved performance characteristics such as high green strength, increased wear resistance and improved processability, when compared with corresponding polymers having a low 1,4-trans-butadienyl content. The 1,3-butadiene polymers having a high 1,4-trans-butadienyl content may conveniently be prepared via the anionic polymerization of 1,3-butadiene as such or in combination with other suitable monomers.

Methods for the preparation of such high 1,4-trans-butadienyl polymers are known and have been described in e.g. U.S. Pat. 4,080,492, in which process a catalyst composition is employed consisting of a) an organolithium compound and b) a cocatalyst system consisting of a compound of barium or strontium and an organometallic compound of aluminum or zinc. When comparing the anionic polymerization process according to this patent with the organolithium-initiated anionic polymerization of 1,3-butadiene, it could be observed that the catalyst composition employed in the process for the preparation of the high 1,4-trans-butadienyl polymer had a lower activity, i.e. the polymerization reaction proceeded more slowly. The lower activity of the catalyst composition appears to be the price for obtaining a high 1,4-trans-butadienyl content in the 1,3-butadiene polymer.

Generally, the use of a less active catalytic system will not pose a serious problem. However, with the preparation of certain types of 1,3-butadiene copolymers having a high 1,4-trans-butadienyl content, such as the corresponding 1,3-butadiene block copolymers, the use of less active catalyst compositions could be a serious disadvantage. In the preparation of such block copolymers, it is very important to achieve substantially complete monomer conversion for each polymer block before the addition of the monomer or monomer mixture required for preparation of subsequent blocks. The use of a less active catalyst composition could seriously delay the addition of the monomer required for the subsequent polymer block, or otherwise could result in the formation of a non-desired intermediate copolymer block.

It will therefore be appreciated that with certain polymerization process modes, the effects of using a less active catalyst system may be disadvantageous if not unacceptable. Hence there is considerable need for improvement in the activity of catalyst compositions which are used in the preparation of conjugated diene polymers, such as 1,3-butadiene polymers, having a high 1,4-trans-dienyl content.

The problem underlying the present invention is developing a high activity catalyst compositions for preparing conjugated diene polymers, particularly 1,3-butadiene polymers, having a high 1,4-trans-dienyl content.

SUMMARY

As a result of extensive research and experimentation there was surprisingly found a high activity catalyst composition for preparing homopolymers and copolymers of conjugated dienes, the polymers having a high 1,4-trans-dienyl content. The catalyst composition comprises an organolithium compound, a barium, strontium or calcium compound and a specific trialkylaluminum compound.

Accordingly the invention includes an anionic polymerization catalyst composition comprising:
an organolithium compound,
a barium, strontium or calcium alcoholate or thiolate, and
a trialkylaluminum compound having at least 13 carbon atoms per molecule.

The present invention further includes the use of these catalyst compositions in anionic polymerization processes for the preparation of conjugated diene polymers having a high 1,4-trans-dienyl content, the diene polymers preferably being homopolymers or copolymers, and especially block copolymers, of 1,3-butadiene having a high 1,4-trans-butadienyl content and a low vinyl content, as well as to the polymers thus prepared and to shaped objects being at least partially derived therefrom. In the context of the present invention, the term high 1,4-trans-dienyl content refers to a 1,4-trans-dienyl content which is higher than that obtainable via the corresponding organolithium-initiated polymerization process. More in particular the term high 1,4-trans-butadrenyl content refers to a 1,4-trans-butadienyl content of at least 70%.

DETAILED DESCRIPTION OF THE INVENTION

The invention includes an anionic polymerization catalyst composition comprising:
an organolithium compound,
a barium, strontium or calcium alcoholate or thiolate, and
a trialkylaluminum compound having at least 13 carbon atoms per molecule.

The present invention further includes the use of these catalyst compositions in anionic polymerization processes for the preparation of conjugated diene polymers having a high 1,4-trans-dienyl content, the diene polymers preferably being homopolymers or copolymers, and especially block copolymers, of 1,3-butadiene having a high 1,4-trans-butadienyl content and a low vinyl content, as well as to the polymers thus prepared and to shaped objects being at least partially derived therefrom. In the context of the present invention, the term high 1,4-trans-dienyl content refers to a 1,4-trans-dienyl content which is higher than that obtainable via the corresponding organolithium-initiated polymerization process. More in particular the term high 1,4-trans-butadienyl content refers to a 1,4-trans-butadienyl content of at least 70%.

The trialkylaluminum compounds which may suitably be used in the catalyst compositions of the present invention will generally not have more than 48 carbon atoms per molecule, as it can be expected that the viscosity of solutions of trialkylaluminum compounds in hydrocarbon solvents will become unacceptably high, or, alternatively the solids content of said solutions will become unacceptably low, when the number of carbon atoms per molecule of trialkylaluminum exceeds 48.

Examples of suitable trialkylaluminum compounds include tripentylaluminum, trihexylaluminum, trioctylaluminum, trinonylaluminum, tri(decyl)aluminum, tris(2-ethylhexyl)aluminum, tricyclopentylaluminum, tris(2,2,4-trimethylpentyl)aluminum, triundecylaluminum, tridodecylaluminum, (ethyl)-(didodecyl)aluminum, tri-n-hexadecylalumnum, tri(-tridecyl)aluminum, (decyl)(diethyl)aluminum, and (ethyl)(dihexyl)aluminum.

Preferred trialkylaluminum compounds have from 20–40 carbon atoms per molecule, and especially preferred are the trialkylaluminum compounds wherein the three alkyl groups are the same, such as trioctylaluminum, trinonylaluminum, tri(decyl)aluminum, triundecylaluminum, tridodecylaluminum and tri(-tridecyl)aluminium.

The barium, strontium and calcium alcoholates which may be used in the catalyst compositions of the present invention may suitably be derived from optionally substituted alcohols such as methanol, ethanol, 1-propanol, 2-propanol, allyl alcohol, 1-butanol, tert-butyl alcohol, cyclopentanol, trifluoroethanol, 1-hexanol, 1-octanol, 1-decanol, 3-methyl-3-pentanol, 2-methyl-2-butanol, 3-methyl-2-hexanol, benzyl alcohol as well as alkoxy alcohols such as ethylene glycol monomethyl ether, ethylene glycol monobutyl ether, diethylene glycol monomethylether, diethylene glycol monophenyl ether and triethylene glycol monobutyl ether. Examples of suitable, optionally substituted aromatic alcohols include phenol, 1-naphthol, 2,6-di-tert-butylphenol, 2,4,6-tri-tert-butylphenol, nonylphenol, and 4-phenylphenol. Examples of suitable, optionally substituted thiols whereon the corresponding thiolates may be based include ethanethiol, butanethiol, cyclohexanethiol, thiophenol and 2-naphthalenethiol.

Nonylphenol is a preferred alcohol from which the barium, strontium and calcium alcoholates may be prepared. Barium alcoholates are the preferred alcoholate or thiolate component of the catalyst compositions of the present invention.

The organolithium compound present in the catalyst compositions of the present invention is preferably selected from the group consisting of alkyl organolithium compounds such as ethyllithium, butyllithium, sec-butyllithium, tert-butyllithium, pentyllithium, and of alkenyl organolithium compounds such as allyllithium, propenyllithium and 2-methyl-2-propenyllithium. Butyllithium and sec-butyllithium are preferred alkyl organolithium compounds, butyllithium being especially preferred.

It is conceivable, when employing the catalyst compositions of the present invention for the preparation of e.g. 1,3-butadiene polymers via an anionic polymerization process, that their activity will be closely related to the molar ratio wherein the different catalyst components will be present. Also the concentration of 1,4-trans-butadienyl in the polymers thus prepared will depend on said molar ratio. In order to obtain catalyst compositions having a high degree of activity, as well as to prepare 1,3-butadiene polymers with a high 1,4-trans-butadienyl content, the molar ratio of barium, strontium or calcium metal/aluminum metal in the catalyst composition should be in the range of from 1:2 to 1:6, preferably 1:4, and the molar ratio of lithium metal/aluminum metal should be in the range of from 0.8:1 to 1.2:1, preferably 1:1.

As stated above, the present invention also includes the use of the above described catalyst compositions in an anionic polymerization process for the preparation of polymers of conjugated dienes, and more in particular in a process for the preparation of 1,3-butadiene polymers having a high 1,4-trans-butadienyl content and a low vinyl content, which process comprises the polymerization of 1,3-butadiene, optionally together or in combination with one or more other suitable monomers. Generally such a polymerization is conducted in a closed reactor, which reactor is preferably a pressure reactor, equipped with stirrer, heating and cooling facilities, a gas inlet, as well as with facilities to introduce monomer, catalyst and optional auxiliary compounds. Although such a polymerization may in principle be conducted in bulk, it is preferred, in order to avoid any unnecessary heat transfer problems, to conduct said polymerization in the presence of an inert solvent or diluent. Suitable solvents or diluents are hydrocarbon compounds. Examples of such hydrocarbon compounds include benzene, toluene, the xylenes, ethylbenzene, trimethylbenzene, mesitylene, hexane, heptane, octane, 2,2,4-trimethylpentane, nonane, cyclopentane, cyclohexane, cycloheptane, cyclooctane and mixtures thereof. Aliphatic and cycloaliphatic hydrocarbon compounds are preferred solvents or diluents in the process of the present invention, cyclohexane being especially preferred.

The amount of solvent or diluent to be employed will generally be sufficient to provide an ultimate polymer solution having a solids content not higher than 20% m, and preferably not higher than 15% m.

In general the solvent and monomer(s) are charged into the reactor whereupon the reactor is flushed e.g. with an inert gas such as nitrogen. Subsequently the reactor contents may be brought to the desired temperature, before or after the catalyst addition.

The amount of catalyst required is generally small, relative to the amount of monomer present. In practice the actual amount of catalyst to be employed will generally be determined by the ultimate polymer requirements. For example in the preparation of a polymer having a high average molecular weight less catalyst will be required than when preparing a polymer with a low average molecular weight from the same amount of monomer.

The polymer chains in an anionic polymerization process are "living" polymer chains, i.e. they are not self-terminating. As long as monomer is available or supplied the polymer chains will continue to grow, thereby increasing the average molecular weight. The preparation of polymers having an extremely high average molecular weight via such an anionic polymerization process will however require very long polymerization times due to the low concentration of living sites in the reactor. Hence, it will be appreciated by those skilled in the art that in such a process the availability of a catalyst composition, having a high activity, will be a considerable technical advantage.

When employing the catalyst compositions of the present invention in an anionic polymerization process as described above, the amount of catalyst composition will be expressed as mmoles of barium, strontium or calcium metal per 100 g of monomer. Generally said ratio will be in the range of from 0.01-100 mmol of Ba, Sr or Ca per 100 g of monomer and preferably from 0.1-5 mmol per 100 g of monomer. Preferred catalyst compositions for use in said process are based on barium alcoholates or thiolates, and especially preferred with reference to the active complex preparation are barium alcoholates based on alcohols having more than 10 carbon atoms per molecule. Barium di(nonylphenoxide) is a preferred barium alcoholate.

When the catalyst compositions of the present invention are employed in an anionic polymerization process, e.g. for the preparation of 1,3-butadiene polymers having a high 1,4-trans-butadienyl content and a low vinyl content, the catalyst composition may be added to the reactor via a separate addition of the individual catalyst components, e.g. as a solution in a suitable hydrocarbon solvent, which solvent is preferably the same as the solvent employed for the polymerization. Alternatively the barium, strontium and calcium alcoholate or thiolate may be premixed with the trialkylaluminum in the desired molar ratio, and subsequently added to the reactor. Premixing of the alcoholate or thiolate and the trialkylaluminum may conveniently be conducted by vigorously stirring the alcoholate or thiolate under a dry inert (nitrogen) atmosphere with the required amount of trialkylaluminum in a hydrocarbon solvent, which solvent is preferably the same as the solvent present during the polymerization, such as cyclohexane, until a clear homogeneous solution is obtained. The preparation of such a premix may conveniently be conducted at a temperature in the range of from room temperature to approximately 80° C. The premix solutions prepared by this procedure remained clear over a long period of time, even after cooling to room temperature. The corresponding premix solutions based on triethylaluminum and triisobutylaluminum formed a barium aluminate precipitate upon cooling to room temperature.

It will be appreciated that the good solubility of the premixes based on the trialkylaluminum compounds having at least 13 carbon atoms per molecule, forms a further attractive feature of the present invention.

When employing a premix as mentioned above, the organolithium compound is added separately to the reactor and preferably in the form of a solution in a hydrocarbon solvent as mentioned above. In the anionic polymerization process employing a catalyst composition of the present invention it is of course also possible to modify the catalyst addition procedure as described above by initially charging only a part of the amount of catalyst composition required into the reactor, e.g. by separate addition of the individual components or via the above described premix procedure, and subsequently adding the remaining amount in one or more additions to the reactor during the polymerization.

In an anionic polymerization process, as described above, the living polymer chains are generally deactivated upon completion of the polymerization, before being isolated from the reaction medium. One method for accomplishing said deactivation comprises contacting the living polymer chains with a deactivating compound such as an alcohol. Deactivation with an alcohol leaves the molecular weight of the polymer chains substantially unchanged. Another method for deactivating the living polymer molecules comprises the addition of a so-called coupling agent to the reaction medium. The coupling agents have depending on their functionality, the ability to react with two or more living polymer chains, thereby forming linear or branched polymer molecules, the molecular weight of the linear or branched polymers being a manifold of that of the uncoupled molecule. Suitable coupling agents which may be employed include esters such as diethyladipate, ethylbenzoate and diphenylcarbonate; organophosphates such as triethylphosphate and tris(nonylphenyl)phosphite; multihalide silicon compounds such as tetrachlorosilane, trichloromethylsilane and dichlorodiethylsilane; and multihalide tin compounds such as tetrachloro tin and trichloromonomethyl tin; as well as compounds such as divinylbenzene. Such compounds may conveniently be employed in a ratio of 0.05-1.0 mol of coupling agent per mol of lithium metal, which amounts of coupling agent may be charged into the reactor in one or more additions.

The polymerization process as described above may conveniently be conducted at a temperature in the range of from 0°-130° C. and preferably at a temperature in the range of from 30°-100° C.

Depending on the type of polymerization procedure employed and on the monomer(s) used therein, a wide range of polymer types may be prepared such as homopolymers, random copolymers e.g. copolymers based on a conjugated diene and a vinylaromatic compound, block polymers e.g. diblock or multiblock copolymers wherein the multiblock copolymers may be linear or branched polymers, and wherein the polymer blocks may be homopolymer or copolymer blocks.

Monomers which may conveniently be employed in the polymerization process wherein a catalyst composition of the present invention is employed, include conjugated dienes such as 1,3-butadiene, isoprene, 2,3-dimethyl-1,3-butadiene, 2,4-hexadiene, 2-phenyl-1,3-butadiene and piperylene, as well as vinylaromatic compounds such as styrene, o-, m- and p-methylstyrene, α-methylstyrene, methoxystyrene, 1-vinylnaphthalene, dimethylstyrene and p-tert-butylstyrene, as well as other vinyl monomers such as methylacrylate, methylmethacrylate and vinylpyridine.

In the preparation of conjugated diene polymers, e.g. 1,3-butadiene polymers having a high 1,4-trans-dienyl content according to the process as described above, it has surprisingly been observed that the ultimate 1,4-trans-butadienyl content of the polymer was generally higher for a given molecular weight, or alternatively the molecular weight was higher for a given trans content, when conducting the polymerization according to a semi-batch procedure rather than a batch polymerization procedure. For the semi-batch procedure, only a part of the monomer is introduced into the reactor at the beginning of the reaction together with solvent and the catalyst composition, and the remaining amount of monomer is added continuously or discontinuously to the reactor during polymerization. This semi-batch process for the preparation of 1,3-butadiene polymers having a high 1,4-trans-butadienyl content employing a catalyst composition of the present invention forms a preferred embodiment of the present invention.

The polymers prepared via a process as described above can be advantageously used in many different outlets such as in tires, wire and cable insulation, protective coatings for fabrics and in shoe soles. A preferred outlet for selected polymers and especially for such block copolymers having at least one substantially polyconjugated diene block and more particularly a polybutadiene block having a 1,4-trans-butadienyl content of at least 85%, is the use as a precursor in the preparation of thermoplastic elastomeric block polymers having aliphatic semi-crystalline end blocks and elastomeric mid blocks. Preparation of the precurser can be effected by a substantially complete hydrogenation of said polybutadiene block copolymers via known processes.

The invention will be further illustrated with the aid of the following examples, for which the following information is provided.

Abbreviations used:

| | |
|---|---|
| THA | trihexylaluminum |
| TOA | trioctylaluminum |
| TDDA | tridodecylaluminum |
| THDA | trihexadecylaluminum |
| TEA | triethylaluminum |
| TIBA | triisobutylaluminum |
| BuLi | Butyllithium |
| B-I-B | polybutadiene-polyisoprene-polybutadiene |
| S-B-S | polystyrene-polybutadiene-polystyrene |
| Four-star | branched block copolymer having four polymer chains connected to the coupling agent. |

Analytical methods:

1,4-trans-butadienyl and vinyl content were determined via infrared spectroscopy and $^{13}$C-NMR.

Number average molecular weight (Mn), molecular weight distribution (Mw/$_{Mn}$), and coupling efficiency (CE=ratio of coupled /uncoupled polymer) were determined via gel permeation chromatography, employing polystyrenes for the calibration.

Preparation of Barium alcoholates (Ba(OR)$_2$).

a) R is ethyl, trifluoroethyl or allyl.

In a nitrogen-purged 300 ml Schlenk vessel, 100 ml of the relevant alcohol, which had been dried over mol sieves, was cooled to 0° C. (ice/water). Under vigorous stirring 5 g of barium metal granules were added. The cooling medium was removed and the reaction mixture was allowed to warm up to approx. 60° C. Upon completion of the reaction a clear solution was obtained. The alcoholates were obtained in an approx. 95% m yield after evaporation of the excess alcohol and drying at 100° C. and 0.13 mbar.

b) R is isopropyl or tert-butyl.

In a nitrogen-purged 300 ml Schlenk vessel 100 ml of the relevant alcohol was mixed with 2 g of bariumhydride-powder and the temperature was raised to 97° C. for 2-propanol and to 83° C. for tert-butyl alcohol. Stirring was maintained at said temperature for 6 h. Subsequently the residual hydride was removed by filtration and the filtrates were evaporated to dryness under reduced pressure (1.33 mbar) which was followed by further drying at 100° C. and 0.13 mbar, yielding the barium alcoholates in respectively 80 and 65% m.

c) R is nonylphenyl or ethoxi-ethoxi-ethyl.

In a nitrogen-purged 300 ml Schlenk vessel 3.2 g (14 mmol) of freshly prepared barium ethoxide was added to a solution of 25 mmol of the relevant alcohol in 100 ml of dry cyclohexane. Under vigorous stirring the temperature was raised to 80° C. and stirring continued for 30 min. Whereupon the residual barium ethoxide was filtered off and the filtrate evaporated to dryness at 0.13 mbar. The residual barium alcoholate was further dried at 100° C. and 0.13 mbar, yield barium alcoholate: approx. 90% m.

Preparation of the Barium alcoholate/trialkylaluminium premix.

Under a dry nitrogen atmosphere 7.2 g (12.5 mmol) of barium di(nonylphenoxide) was mixed under vigorous stirring with 100 ml of a 0.5M solution of trialkylaluminium (50 mmol) in cyclohexane. Stirring was continued at 60° C. until a clear homogeneous solution was obtained.

With TEA and TIBA a gradual precipitation of the barium-aluminium complex formed, could be observed upon cooling to room temperature.

Polymer stabilization

Upon completion of the polymerization and before commencing the polymer isolation 0.6 phr of an antioxidant (Ionol CP, ex Shell) was added to the polymer solution.

Trialkylaluminum compounds

These compounds were obtained from Schering AG. W-Germany.

EXAMPLES I–IV

A nitrogen-purged 500 ml pressure glass bottle was charged with 250 ml of dry cyclohexane and 15 g of 1,3-butadiene. The polymerization was conducted at 60° C. in the presence of 0.125 mmol barium di(nonylphenoxide), 0.5 mmol of trialkylaluminum of the type as indicated in the table hereinafter, and 0.5 mmol of BuLi. Samples were taken during the polymerization for determining the monomer conversion and the microstructure of the polymer formed, to which end the samples were precipitated in methanol and dried at reduced pressure (10 mbar) at 50° C. The time required for conversion of 50% of the monomer ($t_{50}$), the microstructure of the polymer formed and the nature of the trialkylaluminum employed are given in Table 1.

Comparative experiments A and B

The procedure of Examples I–IV was repeated employing TEA and TIBA respectively. The corresponding data have been included in Table 1.

EXAMPLES V–VIII

The procedure of Examples I–IV was repeated employing twice the amount of each of the catalyst components. The relevant data have been included in Table 1.

Comparative experiments C and D

The procedure of experiments A and B was repeated with twice the amount of each of the catalyst components. The relevant data have been included in Table 1.

TABLE 1

| Example no. | Trialkyl-aluminum | $t_{50}$ min | 1,4-Trans content % | Vinyl content % | Mw/Mn |
|---|---|---|---|---|---|
| I | THA | 92 | 86 | 3 | 1.4 |
| II | TOA | 85 | 88 | 2 | 1.4 |
| III | TDDA | 75 | 88 | 2 | 1.4 |
| IV | THDA | 45 | 84 | 3 | 1.8 |
| V | THA | 46 | 90 | 2 | 1.4 |
| VI | TOA | 43 | 89 | 2 | 1.4 |
| VII | TDDA | 28 | 90 | 2 | 1.4 |
| VIII | THDA | 17 | 82 | 3.5 | 1.6 |

TABLE 1-continued

| | Trialkyl-aluminum | $t_{50}$ min | 1,4-Trans content % | Vinyl content % | Mw/Mn |
|---|---|---|---|---|---|
| Comparative experiment | | | | | |
| A | TEA | 110 | 86 | 3.5 | 1.3 |
| B | TIBA | 105 | 87 | 2.5 | 1.3 |
| C | TEA | 72 | 89 | 2 | 1.3 |
| D | TIBA | 53 | 90 | 2 | 1.4 |

EXAMPLES IX-XV

The procedure of Examples V-VIII was repeated using 1.0 mmol TDDA, 1.0 mmol of BuLi and 0.25 mmol of Ba(OR)$_2$ of the type (R) as indicated hereinafter in Table 2, which table also represents the relevant polymerization and microstructure data.

Comparative Experiments E-L

The procedure of Examples IX-XV was repeated using TEA instead of TDDA, the corresponding data having been included in Table 2.

TABLE 2

| Example No. | Comparative experiment No. | R | $t_{50}$ min | 1,4-Trans content % | Vinyl content % |
|---|---|---|---|---|---|
| IX | — | Ethyl | 29 | 90 | 2 |
| — | E | Ethyl | 70 | 88 | 2.5 |
| X | — | Trifluoro-ethyl | 25 | 90 | 2 |
| — | F | Trifluoro-ethyl | 68 | 86 | 3 |
| XI | — | tert-Butyl | 30 | 88 | 2 |
| — | G | tert-Butyl | 72 | 86 | 3 |
| XII | — | Isopropyl | 28 | 89 | 2 |
| — | H | Isopropyl | 75 | 87 | 3.5 |
| XIII | — | Allyl | 39 | 82 | 4 |
| — | J | Allyl | 90 | 83 | 3.5 |
| XIV | — | Nonyl-phenyl | 28 | 90 | 2 |
| — | K | Nonyl-phenyl | 72 | 89 | 2 |
| XV | — | Ethoxi-ethoxi-ethyl | 30 | 84 | 3.5 |
| — | L | Ethoxi-ethoxi-ethyl | 72 | 82 | 3.5 |

EXAMPLES XVI-XVIII

The procedure of Examples V-VIII was repeated with the exception that barium di(nonylphenoxide) and the relevant trialkylaluminum were added as a premix which had been prepared according to the method as described above. The $t_{50}$ polymer microstructure data and molecular distribution data are given in Table 3.

Comparative experiments M and N

The procedure of Examples XVI-14 XIX was repeated with the exception that TEA and TIBA were used as the trialkylaluminum compounds. The corresponding data have been included in Table 3.

TABLE 3

| Example No. | Trialkyl-aluminum | $t_{50}$ min | 1,4-Trans content % | Vinyl content % | Mw/Mn |
|---|---|---|---|---|---|
| XVI | THA | 45 | 91 | 2 | 1.4 |
| XVII | TOA | 39 | 90 | 2 | 1.4 |
| XVIII | TDDA | 25 | 90 | 2 | 1.4 |
| XIX | THDA | 23 | 84 | 3.5 | 1.6 |
| Comparative experiment | | | | | |
| M | TEA | 80 | 89 | 2 | 1.4 |
| N | TIBA | 60 | 90 | 2 | 1.3 |

When comparing the $t_{50}$ data obtained in Examples I-XIX with those of the comparative experiments A-N, it can be observed that the catalyst compositions based on trialkylaluminum compounds having $\geq 13$ carbon atoms per molecule do not only demonstrate a considerably higher activity (i.e. shorter $t_{50}$ times) than those based on TEA and TIBA, but that the activity increases with the number of carbon atoms present in the trialkylaluminum molecule. The microstructure i.e. 1,4-trans-butadienyl and vinyl content of the polymers prepared appears to be more or less independent of the type of trialkylaluminum used. Furthermore, it can also be observed that the nature of the alcohol on which the barium alcoholate is based, has only a marginal influence on the catalyst activity when compared with that of the trialkylaluminum.

EXAMPLE XX

A nitrogen-purged 10 l stainless steel reactor equipped with a mechanical stirrer, heating and cooling facilities, a gas inlet, facilities to introduce monomer and a sampling tube, was charged with 7 l of dry cyclohexane and 750 g of 1,3-butadiene. The temperature was raised to 65° C. and under vigorous stirring 32 ml of a barium di(nonylphenoxide)/TDDA premix solution (prepared according to the method as described above) and 16 mmol of BuLi were added to the reactor. After 2.5 h, 2 ml of methanol were added to the reactor. Steam coagulation yielded 700 g of high-trans polybutadiene having a 1,4-trans-butadienyl content of 85%, a vinyl content of 3.5% a Mn of 210,000 and a Mw/$_{Mn}$ =1.5.

EXAMPLE XXI

The procedure of Example XX was repeated with the exception that only 100 g of 1,3-butadiene were charged into the reactor, the remaining 650 g of 1,3-butadiene were added gradually to the reactor over a period of 2 h after the reactor temperature had been raised to 65° C. Upon completion of the monomer addition the reactor temperature was maintained at 65° C. for another 1.5 h. Subsequently the living polymer was deactivated by the addition of 2 ml of methanol and 680 g of polybutadiene were recovered having a 1,4-trans content of 90%, a vinyl content of 2%, Mn=220,000 and a Mw/$_{Mn}$ = 1.3.

EXAMPLE XXII

The procedure of Example XXI was repeated with the exception that the methanol addition was preceded by the addition of 2 mmol of diethyladipate (coupling agent) and which was followed after about an hour by the methanol addition. Ultimate yield was 720 g of a branched four-star polybutadiene having a 1,4-trans content of 89%, a vinyl content of 2%, a Mn (before coupling)=199,000 and a coupling efficiency of 79%.

EXAMPLE XXIII

The procedure of Example XX was repeated with the exception that as monomer a mixture of 750 g of 1,3-butadiene and 250 g of styrene were employed and the polymerization was allowed to proceed for 3 h whereupon the polymerization was terminated by the addition of 2 mmol of diethyladipate. After another hour at 65° C., 2 ml of methanol were added. Ultimately 900 g of a branched four-star styrene-butadiene copolymer was obtained containing 22% m of styrene, a 1,4-trans content of 84%, a vinyl content of 3,5% a Mn (before coupling)=215,000 and a coupling efficiency of 60%.

EXAMPLE XXIV

The reactor as described in Example XX was charged with 7 l of cyclohexane and 300 g of styrene. The temperature was raised to 65° C. whereupon 32 ml of the above described barium di(nonylphenoxide)/TDDA premix solution and 16 mmol of BuLi were added. After 1 h, the styrene polymerization was virtually complete, whereupon 100 g of 1,3-butadiene were added to the reactor while another 600 g of 1,3-butadiene were added to the reactor over a period of 2 h. Upon completion of the 1,3-butadiene polymerization 4 mmol of diphenylcarbonate were added, which was followed after another hour by the addition of 2 ml of methanol.

Ultimately 950 g of a S-B-S triblock copolymer was obtained having a styrene content of 32% m, a 1,4-trans content of 88%, a vinyl content of 3.0% a Mn (before coupling)=199,000 and a coupling efficiency=75%.

EXAMPLE XXV

The procedure as described in Example XXII was repeated but employing 200 g of a 50/50 m/m 1,3-butadiene/isoprene mixture in the reactor and gradually adding 550 g of the same monomer mixture to the reactor over a period of 1 hour. About 700 g of a branched four-star butadiene/isoprene copolymer was obtained having a 1,4-trans-butadienyl content of 87%, a 1,4-trans-isoprenyl content of 41%, a Mn (before coupling)=171,000 and a coupling efficiency of 81%.

EXAMPLE XXVI

The procedure of Example XXI was repeated with the exception that in stead of 650 g only 100 g of 1,3-butadiene were added to the reactor over a period of 1 h. Upon completion of the 1,3-butadiene polymerization it was established that the polymer had a 1,4-trans content of 90%, a Mn=48.000 and a Mw/$M_n$=1.3. Subsequently 200 g of isoprene were added to the reactor and in addition thereto another 400 g of isoprene were gradually added to the reactor over a period of 0.5 h. After completion of the isoprene polymerization it was established that the polyisoprene block had a 1,4-trans-isoprenyl content of 40% and that the overall Mn=145,000 and the Mw/$M_n$=1.3. Next 100 g of 1,3-butadiene were charged into the reactor and another 100 g of 1,3-butadiene were gradually added over a period of 1 h. From hereon the procedure was the same as for Example XXI.

Ultimately 890 g of a linear triblock BIB copolymer was isolated, having a 1,4-trans-butadienyl content of 89% a vinyl content of 2% a Mn=176,000 and a Mw/$M_n$=1.4.

EXAMPLE XXVII

The procedure of Example XXVI was repeated with the exception that, after completion of the isoprene polymerization, 2 mmol of diethyladipate were added to the reactor. From hereon the procedure was the same as described for Example XXII. This resulted in a yield of 770 g of a branched four-star B-I block copolymer having a 1,4-trans-butadienyl content of 90%, a vinyl content of 2%, a 1,4-trans-isoprenyl content of 39%, a Mn (before coupling)=173,000 and a coupling efficiency of 78%.

What is claimed is:

1. Anionic polymerization catalyst compositions comprising:
   an organolithium compound,
   a barium, strontium or calcium alcoholate or thiolate, and
   a trialkylaluminum compound having at least 13 carbon atoms per molecule.

2. Compositions as claimed in claim 1, wherein the number of carbon atoms per molecule of trialkylaluminum compound does not exceed 48.

3. Compositions as claimed in claim 1, wherein the number of carbon atoms per molecule of trialkylaluminum is from 20 to 40.

4. Compositions as claimed in claim 1, wherein the three alkyl groups in the trialkylaluminum compound are the same.

5. Compositions as claimed in claim 1, wherein a barium alcoholate or thiolate is present.

6. Compositions as claimed in claim 5, wherein the alcoholate is based on nonylphenol.

7. Compositions as claimed in claim 1, wherein the organolithium compound is selected from the group comprising of alkyl organolithium and alkenyl organolithium compounds.

8. Compositions as claimed in claim 7, wherein the organolithium compound is butyllithium or sec-butyllithium.

9. Compositions as claimed in claim 1, wherein the molar ratio of barium, strontium or calcium metal to aluminum metal is from 1:2 to 1:6.

10. Compositions as claimed in claim 1, wherein the molar ratio of lithium metal to aluminum metal is from 0.8:1 to 1.2:1.

11. Anionic polymerization catalyst compositions comprising:
    an organolithium compound,
    a barium alcoholate, and
    a trialkylaluminum compound having from 20 to 40 carbon atoms per molecule.

12. Compositions as claimed in claim 11, wherein the three alkyl groups in the trialkylaluminum compound are the same.

13. Compositions as claimed in claim 12, wherein the alcoholate is based on nonylphenol.

14. Compositions as claimed in claim 13, wherein the organolithium compound is selected from the group comprising of alkyl organolithium and alkenyl organolithium compounds.

15. Compositions as claimed in claim 14, wherein the alkyl organolithium compound is butyllithium or sec-butyllithium.

16. Compositions as claimed in claim 15, wherein the molar ratio of lithium metal to aluminum metal is from 0.8:1 to 1.2:1.

* * * * *